UNITED STATES PATENT OFFICE.

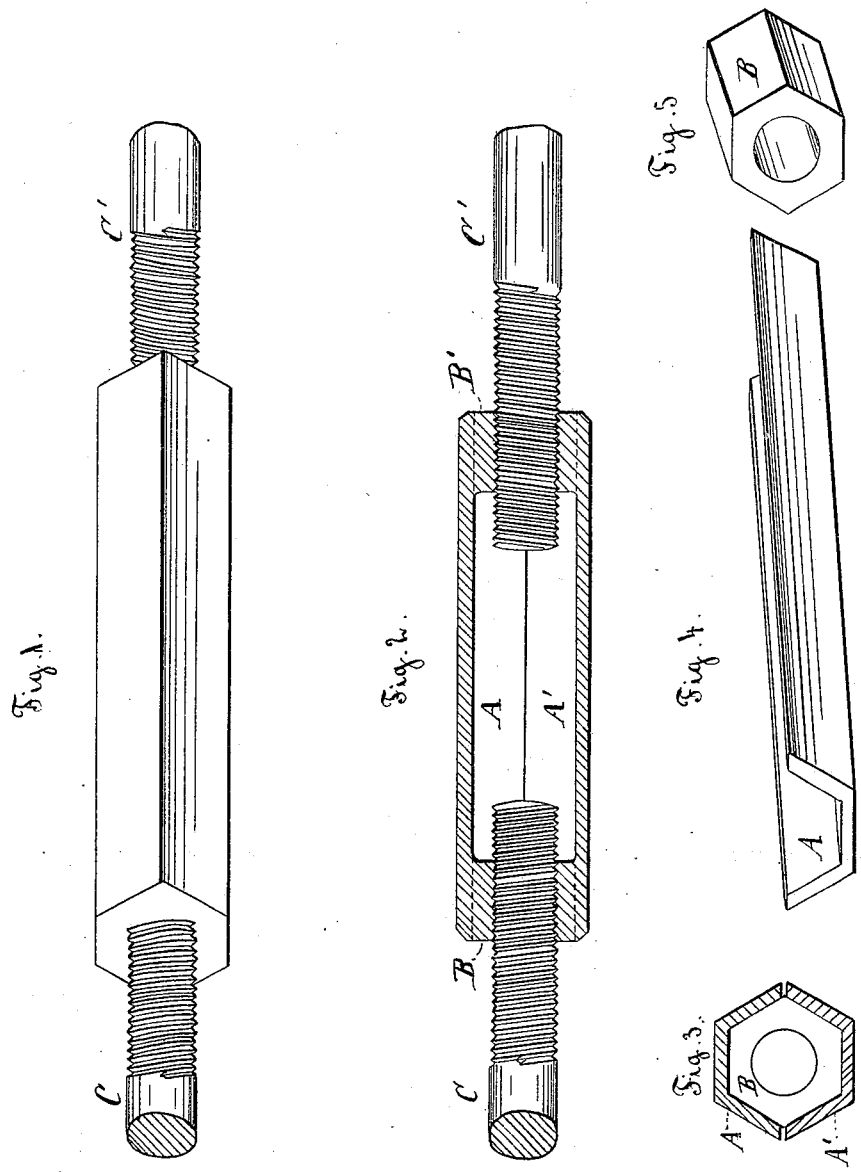

JOHN MOORE AND MICHAEL J. SMITH, OF CHICAGO, ILLINOIS, ASSIGNORS OF ONE-THIRD TO ARTHUR J. O'LEARY, OF SAME PLACE.

MANNER OF MAKING TURN-BUCKLES.

SPECIFICATION forming part of Letters Patent No. 246,409, dated August 30, 1881.

Application filed June 9, 1881. (No model.)

*To all whom it may concern:*

Be it known that we, JOHN MOORE and MICHAEL J. SMITH, both of Chicago, in the county of Cook and State of Illinois, have invented a certain new and useful Improvement in Turn-Buckles, of which the following is a specification.

Our invention relates to turn-buckles as used for adjusting and tightening the iron rods of trusses, stays, and braces in the construction of bridges, roofs, &c. These turn-buckles generally consist of two screw-nuts rigidly united either by two square or round bars or by a tube, and are adapted to form a connecting-link between the ends of two rods having right and left handed screw-threads that with turning the buckle in one direction will bring the rod ends closer together, and turning it in the opposite direction will allow the rod ends to come farther apart or to be disconnected.

Heretofore, by manufacturing turn-buckles of the tubular style the hexagon tube was formed of a single piece of flat iron that was bent around a steel core, was welded on its edges, and was swaged into the desired size and shape, and then hexagon-shaped nuts were welded in its ends. A turn-buckle made in this manner was very expensive to manufacture, since it required very good blacksmithing to form a true hexagon that would fit the wrench on all sides. Besides, on account of the short bending for forming a tube of so small a diameter, the iron plate of which it was to be formed had to be bent in the direction of the grain of the iron, because otherwise the iron would show cracks, and a turn-buckle thus manufactured, with the grain of the iron transverse to its tensile strain, would not have the required tensile strength without being unproportionally heavy.

Our invention consists in forming a turn-buckle by simple means and less labor, and one that will be a true hexagon and a smooth job, by forming a turn-buckle of semi-hexagon channel-bars rolled out expressly for our purpose in an iron-mill, and by connecting two such bars of the required equal lengths with hexagon nuts welded between their ends, as will be more fully hereinafter explained.

In the accompanying drawings, forming a part hereof, Figure 1 represents an exterior perspective view of our turn-buckle; Fig. 2, a longitudinal section of the same; Fig. 3, a cross-section through its center. Fig. 4 is a perspective view of a piece of semi-hexagon channel-iron as it is received from the mill; and Fig. 5 is a similar view of one of the hexagon nuts that are welded between the ends of the semi-hexagon channel-bars.

Like letters denote corresponding parts in all the figures.

A A' are channel-bars, each shaped to form the half of a hexagon; and B B' are two hexagon nuts, that are welded between the ends of the channel-bars A and A' and form the only connection for the same. The nut B is tapped to have a right-handed screw-thread, and nut B' is tapped to have a left-handed screw-thread.

C C' represent the ends of a truss-rod, screw-threaded to fit the screw-threads in the nuts. As will be noticed, these rod ends C C' can be given ample room for adjustment inside of the turn-buckle, and may be provided for more or less adjustment by making the turn-buckles longer or shorter.

In Fig. 3 the semi-hexagon channel-bars are represented as not coming in contact with each other; but this has been done for better representation of being separate bars, and is not to be the rule for making the turn-buckle; but, to the contrary, the channel-bars are intended to form close joints without welding that will hardly be noticed, and will give the turn-buckle the appearance of a solid hexagon.

Turn-buckles thus made of semi-hexagon bars of rolled iron have the grain of the iron longitudinally, and therefore, compared with their weight, have a great tensile strength. They can be manufactured at a much less expense than in the old manner, are exact in shape and measurement, and have a fine and smooth finish to them, not easily obtained by any other mode of manufacture.

What we claim as our invention is—

As an improvement in the art of manufacturing turn-buckles, the process of taking two half-bars of hexagonal shape and uniting them by welding therein at each end a nut of hexagonal shape, substantially as and for the purpose described.

JOHN MOORE.
MICHAEL J. SMITH.

Witnesses:
F. W. KASEHAGEN,
P. SCHREINER.